Figure 4:
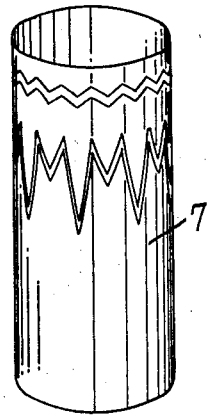

Dec. 28, 1937.  J. G. REISER  2,103,694

PHOTOGRAPHIC APPARATUS

Filed Sept. 27, 1934   4 Sheets—Sheet 1

Inventor
John G. Reiser
By Frank F. Crampton
Attorney

Dec. 28, 1937.   J. G. REISER   2,103,694
PHOTOGRAPHIC APPARATUS
Filed Sept. 27, 1934   4 Sheets-Sheet 2
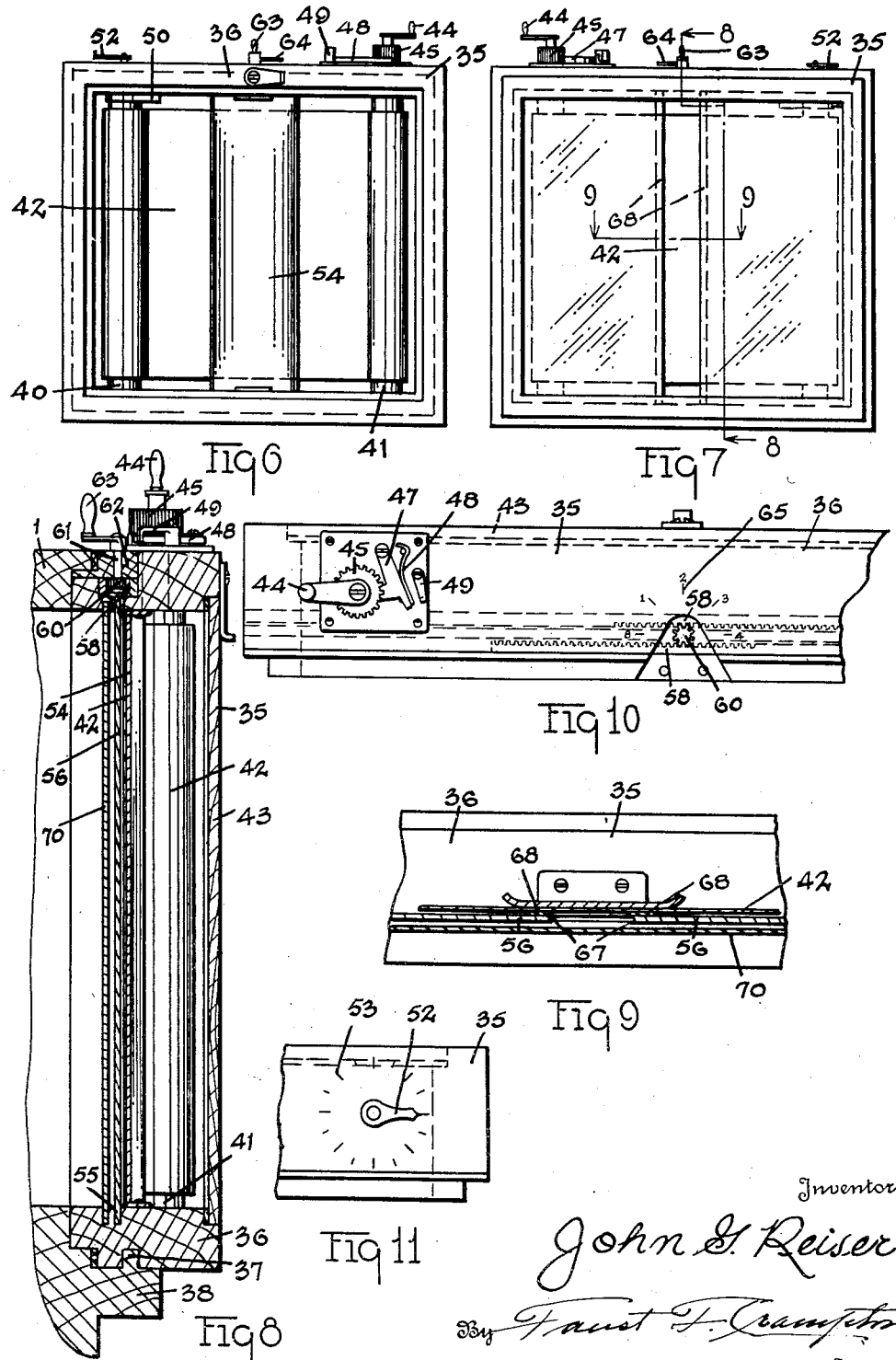

Dec. 28, 1937.  J. G. REISER  2,103,694
PHOTOGRAPHIC APPARATUS
Filed Sept. 27, 1934  4 Sheets-Sheet 3
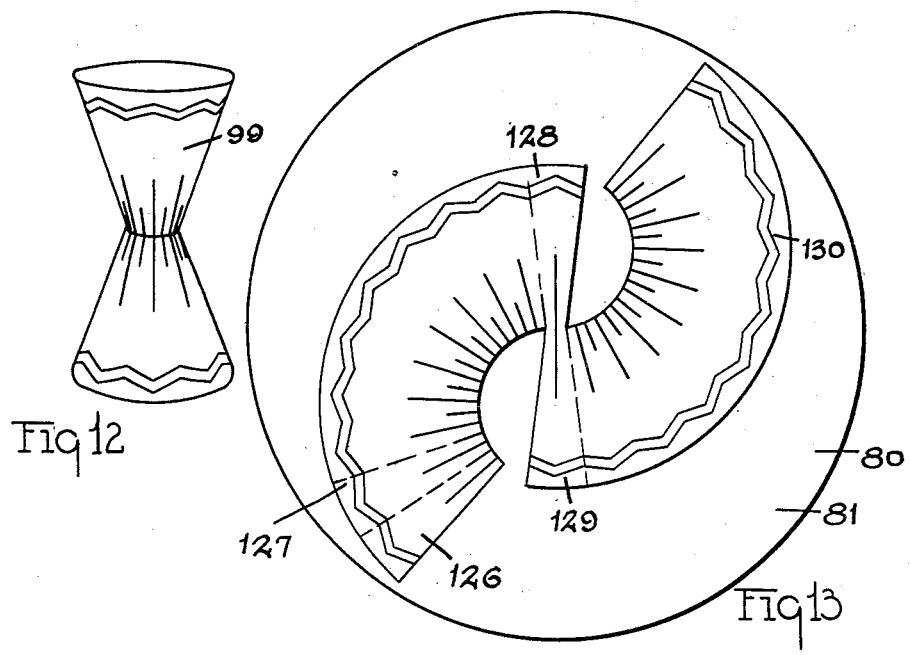
Fig 12
Fig 13
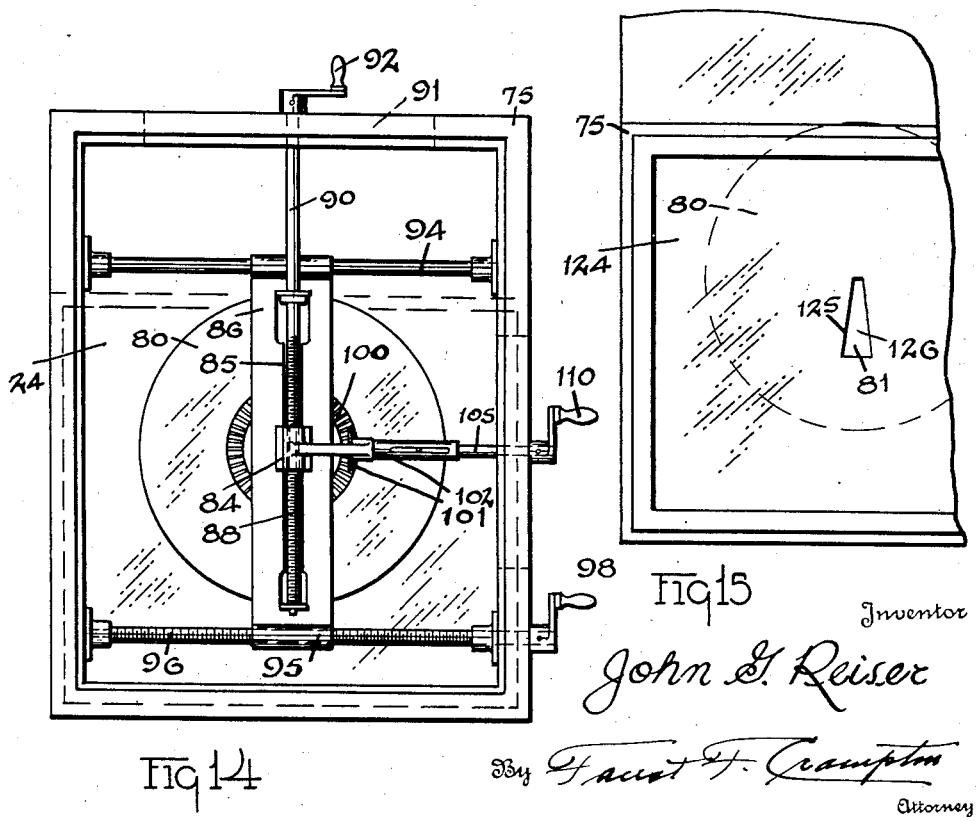
Fig 14
Fig 15
Inventor
John G. Reiser
By Faust F. Crampton
Attorney Dec. 28, 1937. J. G. REISER 2,103,694
PHOTOGRAPHIC APPARATUS
Filed Sept. 27, 1934 4 Sheets-Sheet 4
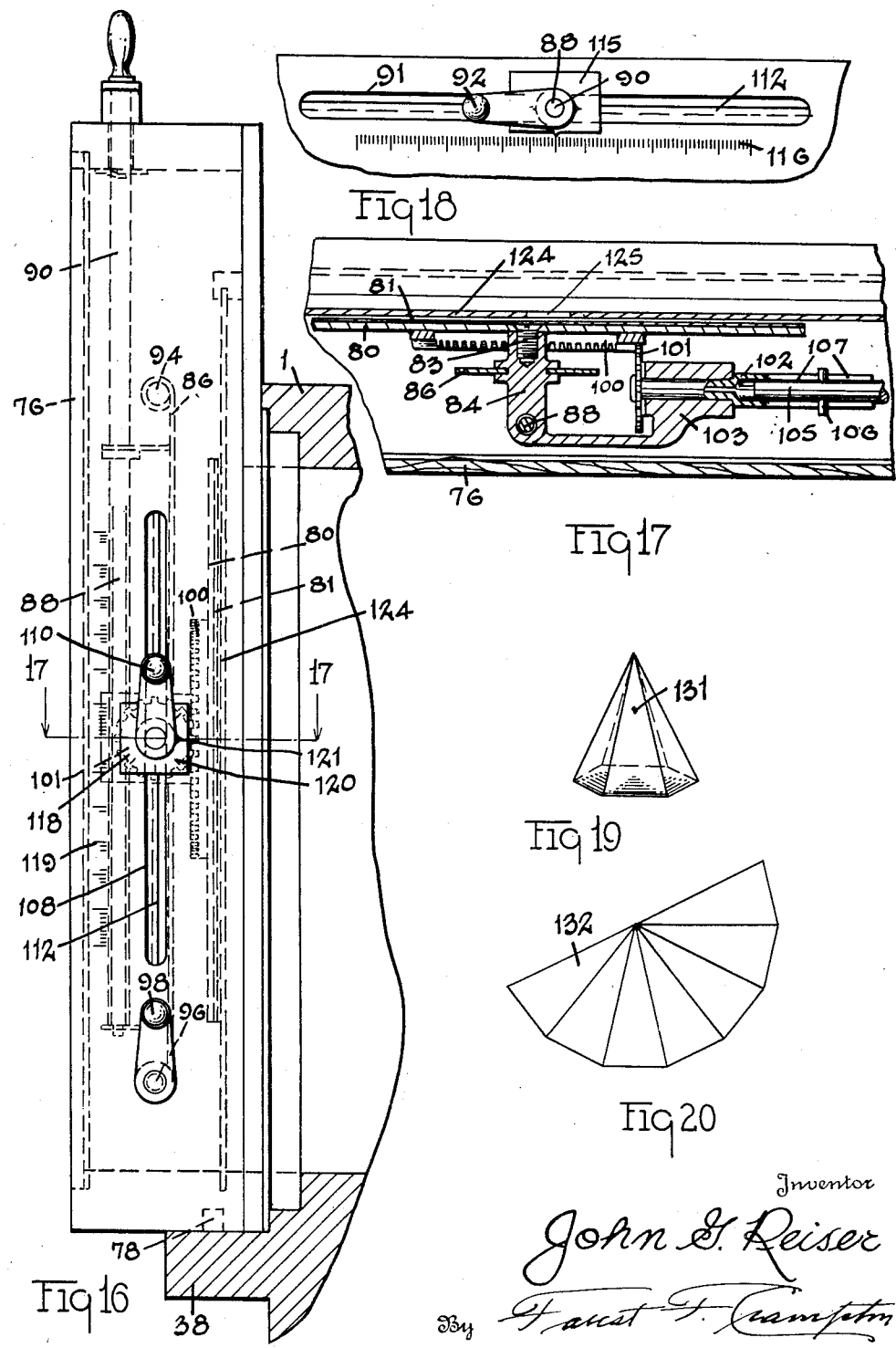

Patented Dec. 28, 1937

2,103,694

UNITED STATES PATENT OFFICE 2,103,694

PHOTOGRAPHIC APPARATUS

John G. Reiser, Toledo, Ohio

Application September 27, 1934, Serial No. 745,716

1 Claim. (Cl. 95—38)

My invention relates to the art of photographing an object so as to impart to an observer of the print resulting therefrom an appreciation of the visual and body appearance thereof. The invention particularly relates to an apparatus for photographing a subject-object whereby the print resulting therefrom may be bent, rolled, or folded to conform generally to the shape of the subject-object, and thus give to the bent, rolled, or folded print an appearance like and comparable to the subject-object, even though the subject-object may be of a three dimensional form. The invention thus readily lends itself to the making of advertising photographs and illustrations of the self-erecting type.

My invention has for an object to provide an apparatus for photographing the various sides or faces of a subject-object in their true interrelation with each other on a single negative whereby a print taken from the negative may be bent, folded, or rolled to approximate the form of the subject-object and will appear to the eye of an observer in a form like that of the subject-object. The invention provides means associated with a camera for moving the unexposed negative film relative to the lens or objective of said camera in sympathy with the contour of a subject-object and the movement thereof relative to the objective. The invention thus provides means for moving the unexposed negative relative to the objective so as to obtain an impression or series of impressions thereof in form and relation with each other that is similar to a projection of the bodily shape of subject-object to a single plane.

Another object of the invention is to provide an apparatus for a camera having means for moving the unexposed negative film through various concentric or eccentric relations to the principal axis of the objective of the camera whereby a photograph may be obtained of spheroidal or partially spheroidal bodies, conical or partially conical bodies, and cylindrical or partly cylindrical bodies. By using the apparatus provided such objects as globes, vases, and/or pillars, and the like may be photographed, and the print resulting therefrom bent or rolled to the approximate body shape of the object.

The invention consists in other features and advantages which will appear from the following description and upon examination of the drawings. Structures containing the invention may partake of different forms and still embody the invention. To illustrate a practical application of the invention, I have selected an apparatus as an example of the various structures and details thereof that contain the invention and shall describe the selected apparatus hereinafter, it being understood that variations may be made without departing from the spirit of the invention. The particular apparatus selected is shown in the accompanying drawings and described hereinafter.

Figure 5:
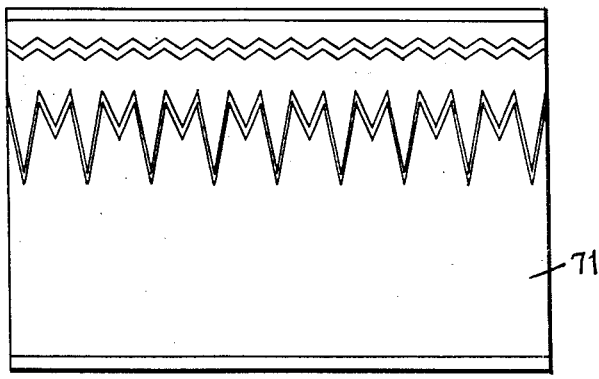
Figure 1:
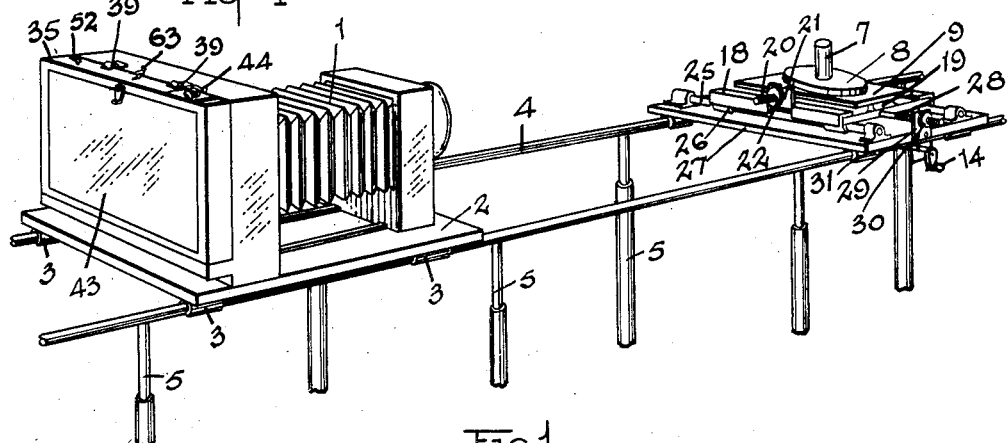
Figures 2, 3:
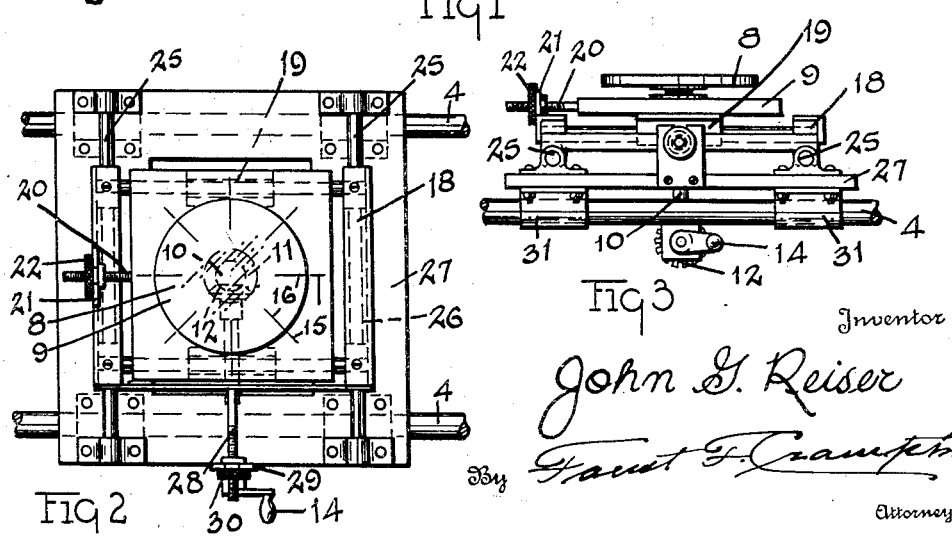

Fig. 1 illustrates a perspective view of an apparatus which embodies elements of my invention. Fig. 2 illustrates a plan view of a part of the apparatus shown in Fig. 1. Fig. 3 illustrates a side view of the part of the apparatus shown in Fig. 2. Fig. 4 illustrates a perspective view of one of the subject-objects of which a photograph may be taken by using my apparatus. Fig. 5 illustrates an untrimmed print resulting from photographing the subject-object shown in Fig. 4. Fig. 6 illustrates a rear view of a camera adapter constituting a part of my apparatus. Fig. 7 illustrates a front view of the adapter shown in Fig. 6. Fig. 8 illustrates a view of a section taken on the plane of the line 8—8 indicated in Fig. 7. Fig. 9 illustrates a view of a section taken on the plane of the line 9—9 indicated in Fig 6. Fig. 10 illustrates an enlarged broken view of one end of the top edge of the adapter illustrated in Figs. 6 and 7. Fig. 11 illustrates an enlarged broken view of the other end of the top edge of the adapter illustrated in Figs. 6 and 7. Fig. 12 illustrates a perspective view of another subject-object which may be made the subject matter of a photograph. Fig. 13 illustrates a view of an exposed negative resulting from photographing the object shown in Fig. 12 by using my apparatus. Fig. 14 illustrates the rear view of a modified form of adapter to be used in photographing the subject-object illustrated in Fig. 12. Fig. 15 illustrates a broken front view of the adapter shown in Fig. 14. Fig. 16 illustrates an enlarged view of an end edge of the adapter shown in Fig. 14. Fig. 17 illustrates a view of a section taken on the plane of the line 17—17 indicated in Fig 16. Fig. 18 illustrates a broken view of the top edge of the adapter shown in Fig. 14. Fig. 19 illustrates a perspective view of another subject-object which may be made the subject matter of a photograph. Fig. 20 illustrates a view of a print resulting from photographing the object illustrated in Fig. 19 obtained by using my apparatus.

My invention provides an apparatus capable of performing a method of photographing which, in the main, consists in exposing to the light transmitted through an objective from a source thereof, as reflected by an object, predetermined areas of an unexposed film successively arranged in spaced registration with each other, the predetermined areas being determinable from the particular shape of the object, as will be more particularly brought out hereinafter. The apparatus includes a conventional camera having a conventional objective and shutter mediums and, preferably for use with objects of not great weight and size, a supporting medium therefor. The camera is provided with an adapter, two forms of which are disclosed hereinafter. The adapters are provided with a means for moving unexposed film relative to the objective. One adapter is particularly disposed to move film relative to the objective and its principal axis along a line of a single horizontal plane, as from left to right, and the other adapter is particularly disposed to move film above and below the horizontal plane, as well as from left to right, and to rotate the film with respect to the principal axis of the objective. The particular movement required is determined by the particular shape of the object of which a photograph is to be taken. For example, when the object is substantially of a cylindrical shape, it is contemplated that the unexposed film will be moved along the line of a single horizontal plane, as from left to right, synchronously with the photographing of neighboring surface portions or areas of the object. For further example, when the object is substantially of a conical shape, it is contemplated, in order to get a true representation of the object on the film, that the film will be moved vertically as well as horizontally and rotated with respect to the objective.

In the accompanying drawings a camera 1 of the well known construction is preferably mounted on a supporting table 2. The table 2 is slideably connected by channel brackets 3 to a frame 4. The frame 4 may have legs 5 of the well known telescopic nature for locating the frame in a horizontal plane regardless of the variation therefrom of the floor on which the legs may rest. Thus, the camera 1 may be shifted along the frame 4 to effect focusing of the objective thereof on an object, such as the object 7, which is to be photographed.

Preferably, the object 7 is supported on a turn-table 8 which is pivotally mounted in a plate 9 by a shaft 10. The shaft 10 is connected by a suitable gear 11 and intermeshing gear 12 with a crank 14 for rotating the table 8 at will. Thus, in photographing an object of multiple sides, the object may be rotated after the photographing of each side thereof. If desired, the plate 9 may have suitable gauge lines 15 which, when located in registration with gauge lines 16 on the table 8 will indicate the degree of rotation of the table 8 with reference to the plate 9.

The plate 9 is slideably mounted on a frame 18 by channel brackets 19 so as to permit lateral shifting of the plate 9 as well as the table 8 and the object 7 supported thereon. A suitable threaded member 20 is connected to the plate 9 and extends through a bracket 21 mounted on the frame 18. A thumb nut 22 may be threaded on the member 20 and journaled in the bracket 21. Thus, by the rotation of the nut 22, the plate 9 may be shifted at will on the frame 18.

In order to shift the frame 18 at right angles to the potential line of movement of the plate 9 to thus move the plate 9 and table 8 in said direction, the frame 18 is slideably mounted on guide rails 25 by channel brackets 26. The guide rails 25 are supported on a suitable table 27. A threaded member 28 is connected to the frame 18 and extends through a bracket 29 mounted on the table 27. A thumb nut 30 is journaled in the bracket 29 and is adapted to be threaded to the member 28. Thus, on rotation of the nut 30, the frame 18 and plate 9, together with the table 8, will be shifted in a direction at right angles to the direction that the plate 9 is moved upon rotation of the nut 22. The table 27 is slideably supported by channel brackets 31 on the frame 4 and thus may be shifted thereon relative to the camera 1, to enable, together with manipulation of the thumb nuts 22 and 30 and crank 14, focusing of the camera on the object 7 on the table 8.

If the object to be photographed is of a cylindrical form or polygonal shape in which the walls extend substantially parallel to the central axis of the object, an adapter 35 is used in conjunction with the camera for obtaining a photograph. The adapter 35 has an enclosing housing or frame 36 which is removably supported, as by the sliding joint 37, on a shoulder 38 extending rearwardly from the camera. The frame 36 may be held in an upright position and in close proximity to the camera by suitable spring clips 39 so that light projected through the camera lens will fall on the inner surfaces of the frame 36. The frame 36 has a film feeding roller 40 which is rotatably mounted in the frame and a film retrieving roller 41, also rotatably mounted in the frame. A strip of negative film, such as the film strip 42, may be wound on the roller 40 and is extended over to and connected with the roller 41. The frame 36 may have a removable lid 43 for enabling winding and setting of the film strip. The roller 41 has a crank 44 which extends exterior of the cabinet and which may be rotated to rotate the roller 41 to draw the film strip from the roller 40 onto the roller 41. If desired, a toothed gear 45 may be mounted on the crank 44 so as to rotate upon rotation of the crank 44 and be disposed so as to be engaged by a pawl 47 biased as by a spring 48. The pawl 47 tends to limit the movement of the crank 44 to but one direction. A lockout means, such as pivotal latch 49, may be provided for engaging the pawl 47 to permit free rotation of the crank 44 in either direction as during preliminary setting of the film strip. Further, the roller 40 may be provided with a conventional brake 50 operative to resist rotation of roller and serving in conjunction with gear 45 and pawl 47 of the roller 41 to maintain the film strip 42 in a taut and extended condition between the rollers. The amount of film strip withdrawn from the roller 40 may be indicated by the movement of an indicator 52, connected to the roller 40, with respect to a scale 53 located in registering relation to the indicator.

The film strip 42 is guided on its movement between the rollers 40 and 41 by a guiding shoe 54 supported in the frame and by an adjustable shutter means slideably supported in the frame and located in close proximity to the shoe 54. The shutter means is formed of a pair of plates 56 slideably supported in grooves 55 formed in the frame.

Each plate 56 has a rack portion 58, the teeth of which are adapted to be engaged by a pinion 60 keyed to a shaft 61 rotatably mounted in a bracket 62. The shaft is connected to a crank 63 having an indicator 64. By rotation of the crank 63, the plates 56 may be moved with reference to each other from an open to closed position, exposing, within the camera, an area of the film strip 42, as determined by the relation of the indicator 64 to a suitable scale 65 located in neighboring relation to the indicator. If desired, the plates 56 may have interfitting edges 67 so that a closure against transmission of light may be effected when the plates are located in edge abutting relation. Further, if desired, the plates 56 may be provided with pads 68 of cushioning material disposed to engage the film strip and resiliently hold the same against the shoe 54. An auxiliary plate 70 may be slideably supported in the frame 36 and may be removed preparatory to photographing.

In photographing the object 7, the object is located on the table 8, and the table 8 is shifted by manipulation of the nuts 22 and 30 to locate the axial center of the object 7 in line with a vertical line passing through axis of the camera lens. The table 2 or table 27 may be shifted on the frame 4 to effect a focus of the lens of the camera on the object 7. The crank 63 is then rotated so as to spread the plates 56 and expose a determinable area of the film strip 42, as indicated by the indicator 64. The degree of opening of the plates is directly proportional to the extent of surface area of the object most proximate to the camera lens. The plate 70 is then withdrawn from in front of the plate 56, and the lens shutters are then opened and closed to effect an exposure. The table 8 is then rotated by the crank 14 to move the object 7 relative to the camera lens a degree commensurate with the surface area just photographed. The crank 44 is likewise operated to move the exposed portion of film strip away from the open area described by the spread of the plates 56, and so as to register one edge of said exposed portion with an edge of one of the plates. The camera lens shutters are again operated to expose the second portion of the film strip to the light effect on the second portion of the area of the object. Successive photographs of successive areas of the object 7 are made on the film strip 42 in like manner, forming a composite negative of the object. A print 71 taken from a negative pertaining to the object 7 is illustrated in Fig. 5. The print 71 may be rolled and will have an appearance, when thus rolled, similar to the object 7.

In the modified form of adapter shown in Figs. 14 to 18, inclusive for photographing objects like those shown in Figs. 12 and 19, an enclosing housing frame 75 is provided. The frame 75 has a removable rear cover lid 76 to facilitate communication with the interior of the frame. The frame 75 is slideably mountable on the shoulder 38 of the camera and held thereon by a sliding joint 78. Within the frame 75 is mounted a film carrier means comprising a rotatable platen 80 on which the unexposed film 81 may be suitably mounted.

The platen 80 is rotatably mounted as by the bolt 83 on a chuck 84. The chuck 84 is slideably mounted in an elongated slot 85 formed in a cross-plate 86. By sliding the chuck 84 along the slot 85, the platen 80 may be moved vertically with respect to the objective. In order to slide the chuck 84 in the slot 85, a threaded member 88 extends through threaded portions 89 formed in the chuck. The threaded member 88 has an extension 90 which extends through a slot 91 formed in the frame and to which a crank 92 may be connected for operating the threaded member. In order to move the platen 80 through horizontal distances, the cross-plate 86 is slideably supported on a guide rail 94 and has a threaded portion 95 adapted to threadably engage with a threaded member 96. The member 96 is rotatably mounted in the frame 75 and is adapted to be rotated by the crank 98. Thus, the platen 80 may be shifted with reference to the objective by the operation of the cranks 92 or 98 to locate the platen and film located thereon in any desired position relative to the objective.

In order to rotate the platen 80 and thus enable the photographing of the double cone object 99 shown in Fig. 12, the platen has mounted thereon a ring gear 100, the teeth of which are adapted to mesh with a pinion gear 101. The pinion gear 101 is keyed to a shaft 102 rotatably supported in an extension bearing bracket 103 of chuck 84. One end of the shaft 102 is adapted to telescopically receive an end of a driving shaft 105. The shaft 105 is slideably keyed to the shaft 102 as by a pin 106 and slots 107. The shaft 105 extends through a slot 108 of the frame 75 and is connected to hand operable crank 110. Thus, by manipulation of the crank 110, the platen 80 and the film thereon may be rotated with respect to the camera objective. The slots 91 and 108 may be closed as against the entrance of light by suitable overlapping felts 112 in a manner well known in the art.

In order to indicate the position and relative movement of the platen 80 within the frame 75, the extension 90 may carry exterior of the frame an indicating plaque 115 which, when the crank 98 is rotated, will be moved relative to a scale 116 formed on the upper edge of the frame 75 and will indicate the relative position of the platen 80 in the frame. Likewise, the shaft 105 may carry a plaque 118 which, when the crank 92 is rotated, will be moved with reference to a scale 119 formed on side edge of the frame to indicate the relative vertical position of the platen 80 with reference to the camera objective. The plaque 118 may also have a scale 120 which in conjunction with an indicator 121 formed on crank 110 may indicate the degree of rotation of the platen with reference to the camera objective.

A mask may be located in the focal-plane of the objective and be used in conjunction with the platen 80 in photographing objects like those shown in Figs. 12 and 19. The mask is embodied in a plate 124 slideably supported in the frame intermediate the film and the camera lens. The plate has a cut-out opening 125 of a shape and dimension as determined by the shape and dimension of the object. The particular shape of the opening 125 is particularly adaptable to photographing the object 99. Variations may be made therefrom to meet the need of each particular case.

In photographing the object 99, after posing the object on the table 8 and focusing the objective thereon, the platen 80 is located with reference to the opening 125 so that on operation of the camera shutter a portion 126 of the film will be exposed. The cranks 92, 98, and 110 are then manipulated so as to locate the portion 127 of the film 81 in registration with the opening 125, and the shutter again operated to obtain the exposure on portion 127. This operation is continued until after portion 128 is exposed. The plate 124 is then withdrawn and reinserted to locate the opening 125 in an inverted position, and the crank 92 is operated to locate film portion 129 in registration therewith. The shutter is then operated to obtain the exposure illustrated on portion 129. Sequential exposures of film portion 130 are obtained in the same manner under reversed circumstances as were portions 127 and 128. A print resulting from the negative film may be cut along its outer outline and rolled to approximate the form of the object 99 and will have an appearance like the object 99. In a similar fashion and manner an object 131 may be photographed to obtain a print 132 which, when bent and folded angularly, has an appearance like the object 131.

I claim:

In combination with a camera having an objective, a film adapter having a housing frame, a partition extending in a plane parallel to the focal plane of the objective and separating the interior of the camera from the interior of the frame, the partition having an opening located in light transmitting relation to the objective, a film carrier, a member for rotatably supporting the film carrier in a plane parallel to the plane of the partition and in light receiving relation to the partition opening, a cross plate for slidably supporting the member, an element rotatably mounted on the cross plate, one end of the said element extending through the frame and having a manipulating handle for causing rotatable movements of the element, the other end of the element having threaded portions adapted to engage the said member whereby, on rotation of the element, the member and film carrier are caused to move linearly in a plane parallel to that of the partition, the frame having a guide rod, the cross plate slidably supported on the guide rod, a second element rotatably supported in the frame, one end of said second element having a manipulating handle for causing rotatable movements of said second element, the other end of said second element having a threaded portion adapted to engage the cross plate whereby, on rotation of said second element, the cross plate, member and film carrier are caused to move linearly in a plane parallel to that of the partition and in directions at right angles to that of first-named linear movement, and manipulative means extending through the frame for causing the film carrier to rotate in a plane parallel to that of the partition whereby any desired increment of movement of the film carrier in any desired direction with respect to the partition opening and objective may be obtained by conjoint actuation of said first element, said second element and said means.

JOHN G. REISER.